United States Patent
Patronas et al.

(10) Patent No.: US 12,010,042 B2
(45) Date of Patent: Jun. 11, 2024

(54) EFFICIENT PARALLELIZED COMPUTATION OF A BENES NETWORK CONFIGURATION

(71) Applicant: MELLANOX TECHNOLOGIES, LTD., Yokneam (IL)

(72) Inventors: Ioannis (Giannis) Patronas, Piraeus (GR); Paraskevas Bakopoulos, Ilion (GR); Eitan Zahavi, Zichron Yaakov (IL); Eran Aharon, Tel Aviv (IL); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 85 days.

(21) Appl. No.: 17/779,157

(22) PCT Filed: Nov. 28, 2019

(86) PCT No.: PCT/GR2019/000085
§ 371 (c)(1),
(2) Date: May 24, 2022

(87) PCT Pub. No.: WO2021/105728
PCT Pub. Date: Jun. 3, 2021

(65) Prior Publication Data
US 2022/0407822 A1 Dec. 22, 2022

(51) Int. Cl.
*H04L 49/253* (2022.01)
(52) U.S. Cl.
CPC ................... *H04L 49/254* (2013.01)
(58) Field of Classification Search
CPC ................................................... H04L 49/254
(Continued)

(56) References Cited

U.S. PATENT DOCUMENTS

| | | | | |
|---|---|---|---|---|
| 5,495,476 A | * | 2/1996 | Kumar | H04Q 3/68 370/380 |
| 2017/0286170 A1 | * | 10/2017 | De | G06F 3/0647 |
| 2020/0120154 A1 | * | 4/2020 | Ren | H04L 67/568 |

FOREIGN PATENT DOCUMENTS

EP        2479943 A1     7/2012

OTHER PUBLICATIONS

Opferman et al., "On a class of rearrangeable switching networks—part I: Control algorithm", The Bell System Technical Journal, vol. 50, No. 5, pp. 1579-1600, May-Jun. 1971.
(Continued)

*Primary Examiner* — Faisal Choudhury
(74) *Attorney, Agent, or Firm* — KLIGLER & ASSOCIATES PATENT ATTORNEYS LTD.

(57) ABSTRACT

A routing controller (30) includes an interface (68) and multiple processors (60) The interface is configured to receive a permutation (76) defining requested interconnections between N input ports and N output ports of a Benes network (24). The Benes network includes multiple 2-by-2 switches (42), and is reducible in a plurality of nested subnetworks associated with respective nesting levels, down to irreducible subnetworks including a single 2-by-2 switch. The multiple processors are configured to collectively determine a setting of the 2-by-2 switches that implements the received permutation, including determining sub-settings for two or more subnetworks of a given nesting level in parallel, and to configure the multiple 2-by-2 switches of the Benes network in accordance with the determined setting.

16 Claims, 4 Drawing Sheets

(58) Field of Classification Search
USPC .......................................................... 370/254
See application file for complete search history.

(56) References Cited

OTHER PUBLICATIONS

Lee et al., "Parallel routing algorithms in Benes-Clos networks" Proceedings of IEEE INFOCOM '96—Conference on Computer Communications, San Francisco, CA, vol. 1, pp. 279-286, Mar. 24-28, 1996.
Kai et al., "Design of partially-asynchronous parallel processing elements for setting up Benes networks in O(log2N) time", International Conference on Photonics in Switching, pp. 1-2, Sep. 15-19, 2009.
Favalli, "Rearrangeability conditions for multirate Benes networks", Proceedings of GLOBECOM '93—IEEE Global Telecommunications Conference, Houston, TX, USA, vol. 2, pp. 734-738, Nov. 29-Dec. 2, 1993.
Douglass et al., "On self-routing in Clos connection networks", IEEE Transactions on Communications, vol. 41, No. 1, pp. 121-124, Jan. 1993.
Huang et al., "A Benes packet network", Proceedings of IEEE INFOCOM, pp. 1204-1212, Apr. 14-19, 2013.
Raghavendra et al., "On self-routing in Benes and shuffle-exchange networks", IEEE Transactions on Computers, vol. 40, No. 9, pp. 1057-1064, Sep. 1991.
International Application # PCT/GR2019/000085 Search Report dated Aug. 5, 2020.

* cited by examiner

EFFICIENT PARALLELIZED COMPUTATION OF A BENES NETWORK CONFIGURATION

CROSS-REFERENCE TO RELATED APPLICATIONS

This application is U.S. national-phase of PCT application PCT/GR2019/000085, filed Nov. 28, 2019, whose disclosure is incorporated herein by reference.

TECHNICAL FIELD

Embodiments described herein relate generally to communication networks, and particularly to methods and systems for efficient parallelized computation of a Benes network configuration.

BACKGROUND

Some switching networks support configurable interconnection between multiple inputs and multiple outputs. One type of a switching network having a multi-stage topology is the "Benes network" or "Benes switch."

Methods for configuring switching networks are descried, for example, in a paper by D. C. Opferman, and N. T. Tsao-Wu, entitled "On a Class of Rearrangeable Switching Networks—Part I: Control Algorithm," published in the Bell System Technical Journal, volume 50: number 5, pages 1579-1600, May-June 1971. In this paper, an algorithm to control a class of rearrangeable switching networks is described, particularly with the base-2 structure. Various methods of implementing this algorithm are also described.

SUMMARY

An embodiment that is described herein provides a routing controller, including an interface and multiple processors. The interface is configured to receive a permutation defining requested interconnections between N input ports and N output ports of a Benes network. The Benes network includes multiple 2-by-2 switches, and is reducible in a plurality of nested subnetworks associated with respective nesting levels, down to irreducible subnetworks including a single 2-by-2 switch. The multiple processors are configured to collectively determine a setting of the 2-by-2 switches that implements the received permutation, including determining sub-settings for two or more subnetworks of a given nesting level in parallel, and to configure the multiple 2-by-2 switches of the Benes network in accordance with the determined setting.

In some embodiments, a processor assigned to the Benes network is configured to determine states of 2-by-2 switches coupled to the N input ports and to the N output ports, and to produce sub-permutations specifying connections required between N/2 input lines and N/2 output lines of respective subnetworks of the Benes network. In other embodiments, a processor assigned to a given subnetwork having K input lines and K output lines, 2<K<N, is configured to receive a K-by-K sub-permutation produced at processing an outer nesting level, to determine states of 2-by-2 switches coupled to the K input lines and to the K output lines, and to produce sub-permutations for configuring K/2-by-K/2 subnetworks of the K-by-K subnetwork. In yet other embodiments, the processors include dedicated hardware processors respectively assigned to the Benes network and to the subnetworks of the nesting levels, and a processor assigned to a subnetwork of a given nesting level is configured to communicate sub-permutations for configuring subnetworks of a subsequent inner nesting level via buffers.

In an embodiment, a processor is configured to alternately scan input lines and output lines of the Benes network or of a subnetwork of the Benes network, and to determine states of an input switch coupled to a given input line and of an output switch coupled to a given output line, so that the given input line and the given output line connect to a common subnetwork of a subsequent inner nesting level. In another embodiment, the routing controller includes a marking array, and the given processor is configured to mark already configured input switches and output switches in the marking array, along with their respective states. In yet another embodiment, the given processor is configured to follow a path created by setting the input and output switches, and in response to detecting that the path creates a cycle, to select an input line coupled to an input switch not yet set, from which to continue the scan.

In some embodiments, a processor is configured to determine a first sub-setting for a given subnetwork, for implementing part of a first permutation of the Benes network, and before a full setting for the entire Benes network corresponding to the first permutation is calculated, to further determine a second sub-setting for the given subnetwork for implementing part of a subsequently received second permutation for the Benes network. In other embodiments, the 2-by-2 switches include 2-by-2 optical switches interconnected using optical links, and the processors are configured to determine bar or cross states for the 2-by-2 optical switches so as to route light signals between the N input ports and the N output ports in accordance with the received permutation.

There is additionally provided, in accordance with an embodiment that is described herein, a method, including, in a routing controller that includes an interface and multiple processors, receiving via the interface a permutation defining requested interconnections between N input ports and N output ports of a Benes network. The Benes network includes multiple 2-by-2 switches, and is reducible in a plurality of nested subnetworks associated with respective nesting levels, down to irreducible subnetworks including a single 2-by-2 switch. A setting of the 2-by-2 switches that implements the received permutation is collectively determined, by the processors, including determining sub-settings for two or more subnetworks of a given nesting level in parallel. The multiple 2-by-2 switches of the Benes network are configured in accordance with the determined setting.

These and other embodiments will be more fully understood from the following detailed description of the embodiments thereof, taken together with the drawings in which:

DETAILED DESCRIPTION OF EMBODIMENTS

Overview

Figure 1:
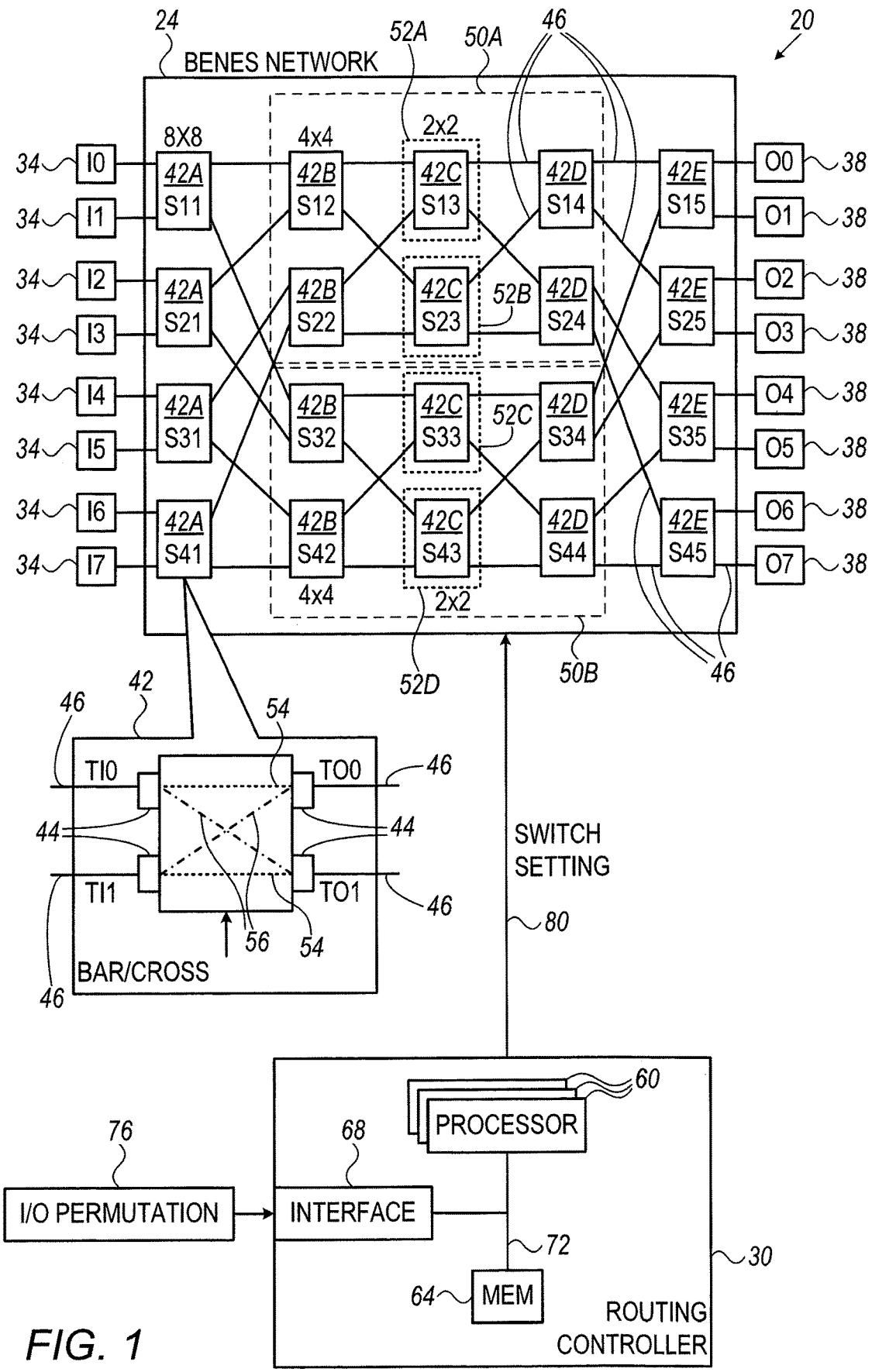
FIG. 1 is a block diagram that schematically illustrates a configurable switching network, in accordance with an embodiment that is described herein.

Embodiments that are described herein provide systems and methods for efficient parallelized computation of a Benes network configuration.

A Benes network comprises a multi-stage switching network comprising 2-by-2 switching devices. A "switching device" is also referred to herein simply as a "switch" for brevity. Benes networks are rearrangeably non-blocking in a sense that any unused input can be connected to any unused output by rearranging its existing connections. Moreover, the topology of a Benes network typically requires using a smaller number of switching devices than a crossbar topology of the same size. The Benes network topology thus makes a good candidate for usage in optical networks and in on-chip networks.

A Benes networks is typically controlled by a routing controller that configures the switching devices to implement a requested connectivity scheme. Full reconfiguration of the Benes network is however complex, and therefore unsuitable for applications that perform high-rate full reconfiguration of the switching network, such as, for example, microsecond burst switching applications.

An N-by-N Benes network may be constructed recursively from smaller Benes subnetworks. The N-by-N Benes network itself reduces into two N/2-by-N/2 subnetworks, each of which further reduced into two N/4-by-N/4 subnetworks, and so on. The Benes network is thus reducible in a plurality of nested subnetworks associated with respective nesting levels, down to irreducible subnetworks comprising a single 2-by-2 switch. At a given nesting level, switches coupled directly to the inputs and outputs of the Benes network (or subnetwork) are referred to as input switches and output switches, respectively.

Consider a routing controller receiving a permutation defining requested interconnections between N input ports and N output ports of a Benes network. The routing controller comprises one or more processors, configured to collectively determine a setting of the 2-by-2 switches that implements the received permutation, including determining sub-settings for two or more subnetworks of a given nesting level in parallel. The routing controller configures the multiple 2-by-2 switches of the Benes network in accordance with the determined setting.

In some embodiments, the routing controller calculates the setting of the network switches hierarchically, based on the nested topology of the Benes network. At the Benes network nesting level, based on the received permutation, a processor calculates the setting for N/2 input switches and N/2 output switches of the Benes network, and produces sub-permutations required for calculating the configurations of two respective N/2-by-N/2 subnetworks of the Benes network. Similarly, at a nesting level corresponding to a K-by-K subnetwork, 2<K<N, based on a sub-permutation produced at processing an outer nesting level, a processor calculates the configurations of input switches and output switches of the K-by-K subnetwork, and produces sub-permutations for configuring two K/2-by-K/2 subnetworks of the K-by-K subnetwork.

In some embodiments, the processors comprise dedicated hardware processors, respectively assigned to the Benes network and to the subnetworks of the nesting levels. In an embodiment, a processor provides a sub-permutation to a processor assigned to a subnetwork of the next inner nesting level via a buffer.

In some embodiments, a processor of the routing controller is implemented using a Finite-State Machine (FSM). The FSM alternately scans input lines and output lines of the Benes network or of a subnetwork of the Benes network, and determines states of an input switch coupled to a given input line and of an output switch coupled to a given output line, so that the given input line and the given output line connect to a common subnetwork of a subsequent inner nesting level.

In some embodiments, the FSM follows a path created by setting the input switches and the output switches of the Benes network or subnetwork, and in response to detecting that the path creates a cycle, the FSM selects an unmatched input line coupled to an input switch not yet set, from which to continue the scanning. In some embodiments, a priority encoder selects the first unmatched input line within a single clock period.

In some embodiments, the routing controller operates in a pipeline mode, in which calculating switch configurations for the N/2-by-N/2 subnetwork(s) based on a first permutation is carried out in parallel to calculating switch configurations for the N-by-N Benes network for a subsequently received second permutation. Pipeline operation may be applied similarly over multiple successive nesting levels.

In the disclosed techniques, a routing controller configures a Benes network using an efficient hierarchical computation that relies on the nested topology of the Benes network. Moreover, switch settings for multiple subnetworks is carried out in parallel, resulting in fast reconfiguration of the Benes network. The routing controller may be implemented in hardware, e.g., using Field-Programmable Gate Array (FPGA) or Application-Specific Integrated Circuit (ASIC) devices.

The disclosed embodiments are suitable for real-time configuration od Benes networks operating in time-slotted manner in practical applications, including, for example, optical networks comprising photonic/optical switches and on-chip networks.

System Description

FIG. 1 is a block diagram that schematically illustrates a configurable switching network 20, in accordance with an embodiment that is described herein.

Switching network 20 supports fast routing reconfiguration and may be used in various applications such as optical networks, data centers, on-chip networks that require flexible interconnection among multiple modules such as processing cores, and the like. In an on-chip network, various elements may communicate with one another such as, for example, processor-to-processor, processor-to-FPGA, processor-to-Graphics Processing Unit (GPU) and FPGA-to-GPU.

Switching network 20 comprises a Benes network 24, coupled to a routing controller 30. In the present example, Benes network 24 interconnects between a group of eight ports 34 denoted I0 . . . I7 and another group of eight ports 38 denoted O0 . . . O7. In practical implementations, however, Benes network 24 may be used for interconnecting between two groups comprising N ports each, wherein N may comprise any suitable integer other than eight. The description that follows refers mainly to an N-by-N Benes network that interconnects between two groups of ports, each comprising N ports.

In the example of FIG. 1, ports 34 are assumed to function as input ports that receive signals from external elements, and ports 38 are assumed to function as output ports that transmit signals to external elements in accordance with the routing configuration of the Benes network. In alternative embodiments, ports 34 and ports 38 may serve as output ports and input ports, respectively. Further alternatively, each of ports 34 and 38 may comprise a bidirectional port that at any given time may receive or transmit signals.

Depending on the application, ports 34 and ports 38 may connect to external elements (not shown) of any suitable type, such as network nodes, servers, other switching networks and/or devices, and the like.

Benes network 24 comprises multiple switching devices 42, each of which comprising multiple terminals 44 for connecting to other elements via physical links 46. Some switching devices such as 42A and 42E connect between a port 34 or a port 38 and other switching devices. Other switching devices such as 42B, 42C and 42D connect among neighboring switching devices 42. Switching devices 42 are denoted Sij, wherein the indices i=1 . . . 4 and j=1 . . . 5 corresponds to row and column numbers, respectively.

In the description that follows the terms "port," "input port" and "output port" refer to connections of the Benes network to external elements. The terms "line," "input line" and "output line" refer to connections to the Benes network via the ports or to connections to subnetworks of the Benes network.

In the present example, switching device 42 (implementing a 2-by-2 subnetwork) comprises a 2-by-2 switch that internally interconnects between input terminals denoted (TI0, TI1) and output terminals denoted (TO0, TO1). In some embodiments, switching device 42 is configurable in two possible interconnection states. In a state referred to as a "straight" or "bar" state, the switching device connects between terminal pairs TI0-TO0 and TI1-TO1 using internal connections 54. In the other state, denoted a "cross" state the switching device connects between terminal pairs TI0-TO1, and TI1-TO0 using internal connections 56. In the description that follows, switching device 42 is also referred to simply as a "switch" for brevity.

In some embodiments, Benes network 24 comprises an optical switching network. In such embodiments, ports 34 and ports 38 comprise optical ports for receiving and transmitting light signals and switching devices 42 comprise 2-by-2 optical switches. A 2-by-2 optical switch routes light signals between two pairs of terminals 44 in accordance with a bar or cross state to which the optical switch is configured. In this case, links 46 comprise optical-fiber cables of any suitable type. In other embodiments, Benes network 24 comprises an electrical switching network. In such embodiments, ports 34 and ports 38 comprise electrical ports for receiving and transmitting electrical signals, and switching devices 42 comprise 2-by-2 electrical switches. Links 46 in this case comprise electrical cables of any suitable type.

An N-by-N Benes network, e.g., 8-by-8 Benes network 24, may be constructed recursively from smaller Benes subnetworks, down to irreducible subnetworks comprising 2-by-2 switches. The recursive construction thus results in a nested topology of Benes subnetworks, so that a Benes subnetwork of a given nesting level reduces into two (e.g., upper and lower) smaller Benes networks of the following inner nesting level, as described herein.

In the example of Benes network 24, the 8-by-8 Benes network itself is associated with the first (most outer) nesting level. The 8-by-8 Benes network reduces into respective upper and lower 4-by-4 subnetworks 50A and 50B, associated with the second nesting level. Each of 4-by-4 subnetworks 50A and 50B further reduces into upper and lower 2-by-2 subnetworks 52, each comprising an irreducible 2-by-2 switching device 42C. Specifically, 4-by-4 subnetwork 50A reduces to respective upper and lower 2-by-2 subnetworks 52A and 52B, and 4-by-4 subnetwork 50B reduces to respective upper and lower 2-by-2 subnetworks 52C and 52D.

At the first nesting level, N-by-N Benes network connects between N input ports (34) and N output ports (38). The Benes network may be partitioned into an input stage comprising N/2 input switches 42A, an output stage comprising N/2 output switches 42E and a middle stage comprising two N/2-by-N/2 subnetworks (50A and 50B).

Similarly, at subsequent inner nesting levels, a K-by-K Benes network (2<K<N) connects between K input lines and K output lines. The K-by-K Benes subnetwork may be further partitioned into an input stage comprising K/2 input switches (e.g., 42B), an output stage comprising K/2 output switches (e.g., 42D) and a middle stage comprising K/2-by-K/2 subnetworks (e.g., 42C).

A 2-by-2 switch in the input stage at some nesting level connects to each of the upper and lower subnetworks of the subsequent inner nesting level. Similarly, a 2-by-2 switch in the output stage at some nesting level connects to both the upper and lower subnetworks of the subsequent inner nesting level. For example, input switch S21 of the 8-by-8 Benes network connects to switches S12 and S32 in respective 4-by-4 subnetworks 50A and 50B. As another example, output switch S14 of 4-by-4 subnetwork 50A connects to S13 and S23 of respective 2-by-2 subnetworks 52A and 52B.

The topology of the Benes network (e.g., 24), allows connecting between any port 34 and any port 38, via a path of multiple switches 42. An example path between port 34 labeled I1 and port 38 labeled O6 may comprise switches S11, S32, S43, S44 and S45, wherein S11 and S44 are set to the bar state, and S32, S43 and S45 are set to the cross state.

Routing controller 30 comprises one or more processors 60 coupled to a memory 64 and to an interface 68 via a suitable bus 72. Routing controller 30 receives via interface 68 an Input/Output (I/O) permutation 76 that defines a requested connectivity scheme between input ports 34 and output ports 38.

I/O permutation may be represented, for example, by numbering the input ports and the output ports in the range 0 . . . N−1. In this case the permutation may be described in a table, wherein a table entry specifies a connection between an input port and a corresponding output port, the input ports are ordered sequentially. Such a permutation is also referred to as a "forward permutation." An example forward permutation for configuring an 8-by-8 Benes network is depicted in Table 1 below.

TABLE 1

Example I/O forward permutation for an 8 × 8 Benes network

| In  | 0 | 1 | 2 | 3 | 4 | 5 | 6 | 7 |
|-----|---|---|---|---|---|---|---|---|
| Out | 4 | 6 | 7 | 2 | 1 | 3 | 5 | 0 |

In some embodiments, I/O permutation 76 additionally specifies for each output port 38 a corresponding input port 34, wherein the output port numbers are ordered sequentially. Such a permutation is also referred to as a "reverse permutation." The reverse permutation representation allows fast retrieval of an input port number, given an output port number. An example reverse permutation specifying the same connections as the forward permutation above is depicted in Table 2 below.

TABLE 2

Example I/O reverse permutation for an 8 × 8 Benes network

| Out | 0 | 1 | 2 | 3 | 4 | 5 | 6 | 7 |
|-----|---|---|---|---|---|---|---|---|
| In  | 7 | 4 | 3 | 5 | 0 | 6 | 1 | 2 |

In some embodiments, routing controller 30 stores the output port numbers of the forward permutation in a memory (e.g., memory 64), wherein the input port numbers serve as memory addresses. Similarly, routing controller 30 stores the input port numbers of the reverse permutation in a memory, and the output port numbers serve as memory addresses.

Routing controller 30 may receive I/O permutation 76 from any suitable network entity such as, for example, a scheduler (not shown) that controls the operation of Benes network 24. Routing controller 30 may receive the I/O permutation via a control plane, e.g., via a dedicated link serving for control purposes. Alternatively, routing controller 30 receives I/O permutation 76 via a data plane. In this case, a data packet carries the permutation information.

Routing controller 30 may receive I/O permutation 76 in accordance with various timing schemes. In an example embodiment, routing controller 30 receives I/O permutation 76 once or updated at a low rate, for long term connectivity. Alternatively, e.g., when Benes network 24 operates in a slotted-time scheme for burst switching (e.g., microsecond burst mode) routing controller 30 receives an updated I/O permutation 76 cyclically, e.g., at a high rate. As will be described in detail below, the routing controller may be implemented in multiple successive processing stages (corresponding to respective nesting levels), in an embodiment. Assuming operating in a pipeline mode, the period between permutation updates is equal to or higher than the processing time of one (e.g., the slowest) processing stage.

Processors 60 collectively determine a switch setting 80 that specifies bar/cross states to which switches 42 should be set for implementing the end-to-end connectivity defined by I/O permutation 76. Routing controller 30 configures switches 42 of Benes network 24 in accordance with switch setting 80.

Memory 64 stores information required by processors 60 in determining switch setting 80. Such information may comprise, for example, intermediate information passed between the processors in processing the configuration of the Benes network and related subnetworks.

Hierarchical Efficient Computation of Benes Network Configuration

Figure 2:
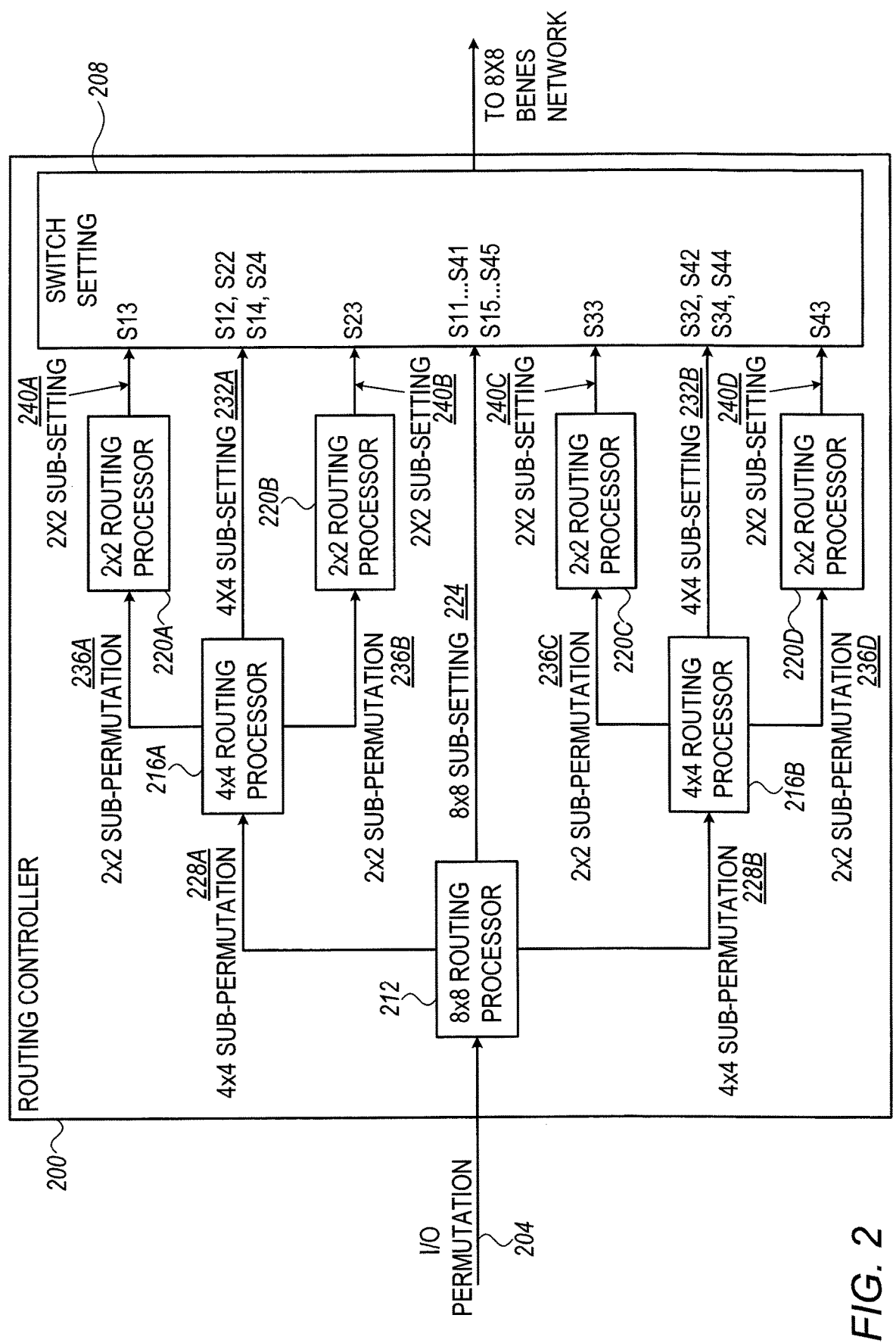
FIG. 2 is a block diagram that schematically illustrates a hardware-implemented routing controller for configuring an 8-by-8 Benes network, in accordance with an embodiment that is described herein.

FIG. 2 is a block diagram that schematically illustrates a hardware-implemented routing controller 200 for configuring 8-by-8 Benes network, in accordance with an embodiment that is described herein.

Routing controller 200, may be used, for example, in implementing routing controller 30 of FIG. 1.

Routing controller 200 receives an I/O permutation 204 (similar to I/O permutation 76) specifying the requested connections between input ports 34 and output ports 38. An example permutation for configuring an 8-by-8 Benes network is depicted, for example, in Table 1 above. In some embodiments, I/O permutation 204 additionally comprises a reverse permutation, e.g., as depicted in Table 2 above.

Routing controller 200 determines a switch setting 208 that implements end-to-end connections between ports 34 and port 38 in accordance with I/O permutation 204, switch setting 208 (similar to switch setting 80) that specifies settings of respective switches 42 in the Benes network to respective bar or cross states. Switch setting 208 may be implemented as a table in memory 64, specifying the bar/cross state for each of the switches Sij, i=1 ... 4, j=1 ... 5. In some embodiments, the bar/cross state is represented as a binary value, e.g., "0" for the "bar" state value and "1" for the "cross" state value.

As will be described below, routing controller 200 calculates switch setting 208 using a hierarchical calculation based on the nesting levels of the Benes topology. In each nesting level the routing controller determines a partial setting, for input switches and output switches of the sub-networks associated with that nesting level, and produces sub-permutations for calculating the setting of subnetworks of subsequent inner nesting levels.

Routing controller 200 comprises multiple routing processors, including a single 8-by-8 routing processor 212, two 4-by-4 routing processors 216A and 216B, and four 2-by-2 routing processors 220A ... 220D. Routing processors 212, 216 and 220 are arranged and operate in a hierarchical structure in accordance with the nesting levels of subnetworks in the Benes network. As such, routing processor 212 handles the full 8-by-8 Benes network, 4-by-4 routing processors 216A and 216B handle respective 4-by-4 subnetworks 50A and 50B, and 2-by-2 routing processors 220A ... 220D handle respective 2-by-2 subnetworks 52A ... 52D.

Based on I/O permutation 204, 8-by-8 routing processor 212 determines an 8-by-8 sub-setting 224 that specifies the setting of input switches S11 ... S41 and output switches S15 ... S45. For a given port 34 and a given port 38 that are to be connected in accordance with I/O permutation 204, routing processor 212 sets an input switch and an output switch to which the given input port and given output port are coupled, so that these ports connect via the configured switches to the same 4-by-4 subnetwork. For example, for connecting between I0 and O5, routing processor 212 may set switch S11 (connected to I0) to the bar state and set switch S35 (connected to O5) to the cross state.

In addition, 8-by-8 routing processor 212 produces 4-by-4 sub-permutations 228A and 228B as input permutations for respective 4-by-4 routing processors 216A and 216B. Sub-permutation 228A specifies connections between input lines connected to switches S12 and S22, and output lines connected to switches S14 and S24 of 4-by-4 subnetwork 50A. Sub-permutation 228B specifies connections between input lines connected to switches S32 and S42, and output lines connected to switches S34 and S44 of 4-by-4 subnetwork 50B.

Each of 4-by-4 routing processors 216A and 216B operates in a similar manner to 8-by-8 routing processor 212 but is assigned to a respective 4-by-4 subnetwork. Based on 4-by-4 sub-permutation 228A, 4-by-4 routing processor 216A produces a 4-by-4 sub-setting 232A specifying the bar/cross setting of switches S12, S22, S14 and S24. Similarly, based on 4-by-4 sub-permutation 228B, 4-by-4 routing processor 216B produces a 4-by-4 sub-setting 232B specifying the bar/cross setting of switches S32, S42, S34 and S44.

4-by-4 routing processor 216A further generates 2-by-2 sub-permutations 236A and 236B as input to respective 2-by-2 routing processors 220A and 220B, and 4-by-4 routing processor 216B generates 2-by-2 sub-permutations 236C and 236D as input to respective 2-by-2 routing processors 220C and 220D. Each 2-by-2 sub-permutation specifies connections between two input lines and two output lines connected to the underlying 2-by-2 switch.

Each of 2-by-2 routing processors 220A, 220B, 220C and 220D determines, based on received 2-by-2 permutation 236A ... 236D, a respective 2-by-2 sub-setting 240A ... 240D, specifying bar/cross state of a respective 2-by-2 switch S13, S23, S33 and S43.

The internal structure of a 2-by-2 routing processor 200 (not shown) is typically simpler than that of K-by-K routing processors, 2<k, e.g., because the 2-by-2 subnetwork is irreducible and the 2-by-2 routing processors (220) need not to produce any sub-permutations. In addition, since there are only two input lines and two output lines, the switch state can be determined using direct logical calculation with no alternate scanning (as will be described in FIG. 3 below).

In the general case, the N-by-N Benes network comprises N/2 input switches and N/2 output switches. The Benes network reduces into two N/2-by-N/2 subnetworks that each further reduces into two N/4-by-N/4 subnetworks, and so on, down to the 2-by-2 irreducible subnetworks.

In some embodiments, dedicated routing processors are assigned to the Benes network and to subnetworks of the nesting levels in various ways. For example, in the embodiment of FIG. 2, a single routing processor (212) is assigned to the 8-by-8 Benes network, two routing processors (216) are respectively assigned to two 4-by-4 subnetworks and four routing processors (220) are respectively assigned to the four 2-by-2 routing processors. In an embodiment, each of the routing processors may be implemented using a dedicated processor 60, implemented, for example, in hardware. In alternative embodiments, one processor 60 is assigned to process two or more subnetworks of the same nesting level. In general, e.g., in large Benes networks, a single processor 60 may be assigned to process multiple different subnetworks. Reusing a processor 60 in implementing more than one routing processor reduces hardware cost, but typically also slows the reconfiguration rate (e.g., in pipeline mode).

In some embodiments, multiple routing processors process multiple respective subnetworks of the same nesting level in parallel. For example, routing processors 216A and 216B receive 4-by-4 sub-permutations 228A and 228B and determine the input switch and output switch settings for subnetworks 50A and 50B in parallel.

In some embodiments, routing controller operates in a pipeline mode. In such embodiments, routing controller 200 receives an updated I/O permutation 204 soon after routing processor 212 produces sub-setting 224 and sub-permutations 236A and 236B, and before the routing controller concluded determining the setting of all switches 42 in accordance with a previously received permutation. In pipeline mode, the routing controller receives input permutations at a high rate and the routing controller requires additional buffering space for intermediate switch settings derived by multiple successive I/O permutations.

In the pipeline mode a routing processor determines a first sub-setting for a given subnetwork, for implementing part of a first permutation of the Benes network, and before a full setting for the entire Benes network corresponding to the first permutation is calculated, further determines a second sub-setting for the given subnetwork for implementing part of a subsequently received second permutation for the Benes network. In some embodiments, pipeline operation is carried out over multiple successive nesting levels.

In some embodiments, a routing processor provides a sub-permutation to a routing processor assigned to a sub-network of an inner nesting level via a buffer, as will be described below.

A Routing Processor Implemented in Hardware

Figure 3:
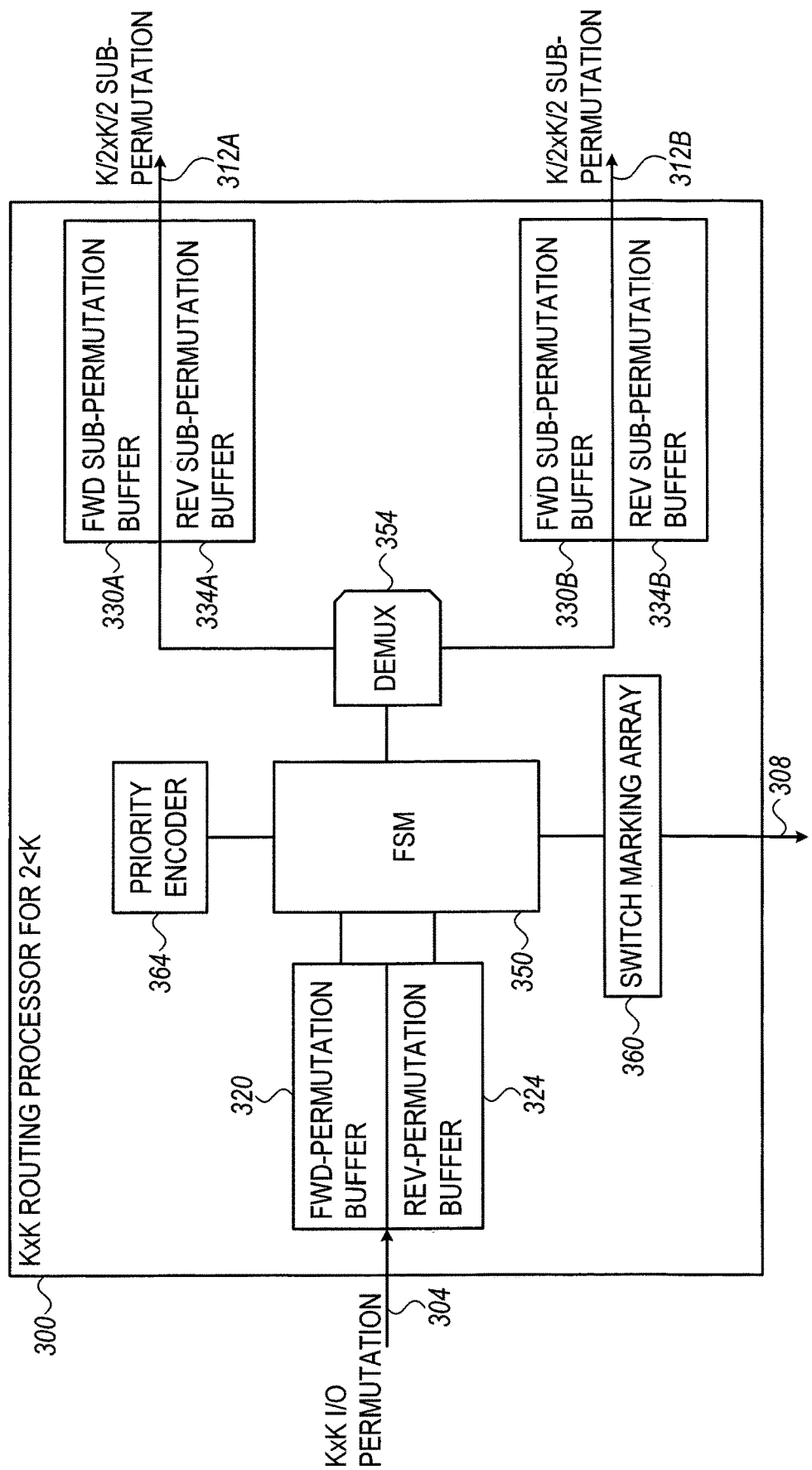
FIG. 3 is a block diagram that schematically illustrates a K-by-K routing processor, in accordance with an embodiment that is described herein.

FIG. 3 is a block diagram that schematically illustrates a K-by-K routing processor 300, in accordance with an embodiment that is described herein.

Routing processor 300 may be used in implementing 8-by-8 routing processor 212, and 4-by-4 routing processors 216A and 216B of routing controller 200 of FIG. 2.

Routing processor 300 receives an I/O permutation 304 (similar to I/O permutation 204) that specifies connections requested between K input lines and K output lines. The routing processor determines a setting 308 for configuring the states of K/2 input switches and K/2 output switches that implements I/O permutation 304. Moreover, routing processor 300 produces K/2-by-K/2 sub-permutations 312A and 312B as input permutations for processing K/2-by-K/2 sub-networks of a subsequent inner nesting level.

In the present example, I/O permutation 304 and each of sub-permutations 312A and 312B comprises a forward permutation part and a reverse permutation part. Routing processor 300 stores the forward and reverse permutation parts of I/O permutation 304 in a FWD-permutation buffer 320 and in a REV-permutation buffer 324, respectively. Similarly, routing processor 300 stores the forward and reverse permutation parts of sub-permutation 312A in buffers 330A and 334A, and of sub-permutation 312B in buffers 330B and 334B.

In some embodiments, buffers 330A and 334A (or 330B and 334B) in a routing processor assigned to a subnetwork of a given nesting level serve as buffers 320 and 324 of the next inner nesting level. This configuration allows direct forwarding of sub-permutations between routing processors. Note that a routing processor should refrain from modifying the buffer content currently used as input to a routing processor of the subnetwork associated with the next inner nesting level. This may require additional buffering space in pipeline mode, as noted above.

Routing processor 300 comprises a Finite-State Machine (FSM) 350, which carries out and controls the calculation of setting 308 and sub-permutations 312. The FSM has access to the forward and reverse permutations in respective buffers 320 and 324. The FSM additionally has access to forward and reverse sub-permutations in respective buffers 330 and 334, e.g., via a demultiplexer 354. The usage of demultiplexer 354 is not mandatory, and in some embodiment may be omitted.

As will be described below, the FSM scans the input lines and the output lines for determining the setting of the K/2 input switches and the K/2 output switches. FSM 350 comprises a marking array 360 for handling switch usage and state. The marking array may comprise an array of registers, e.g., two registers for each input switch and for each output switch. One register serves for marking a switch as "used" or "unused" (or "not yet used") and the other register stores the bar/cross state of the switch. In some embodiments, the FSM initially marks the input switches and the output switches as unused. When FSM 350 determines a bar/cross state of a given switch, the FSM marks that switch, in marking array 360 as "used" and stores the state determined for that switch in the marking array.

In some embodiments, FSM 350 follows a path constructed along visited input switches and output switches. A cycle in the path may occur, when a path that visits less than the entire input switches and output switches, returns to the starting input switch. When the FSM detects a cycle, the FSM selects an unused input switch for continue the scanning.

In some embodiments, the routing processor comprises a priority encoder 364 that efficiently identifies an unused input line in response to detecting a cycle event. The priority encoder may be implemented in various ways. In an example embodiment, priority encoder 364 identifies the first input line connected to an unused input switch in a single clock period. For example, the priority encoder comprises a logical circuit that selects the first switch marked as unused in the marking array. In an alternative embodiment, the priority encoder can be replaced by a component that stores (e.g., in the marking array) an index of an unused switch, ready to be used when a cycle event is detected. When this switch becomes marked as used, the priority encoder searches the marking array, e.g., sequentially, for the next unused switch.

Selecting to include (or exclude) a priority encoder external to the FSM presents a tradeoff between speed and available resources. Using a fast priority encoder may reduce the processing delay of the routing processor, but incurs hardware resources, increased power consumption and the like.

The configurations of switching network 20 and routing controller 30 of FIG. 1, of routing controller 200 of FIG. 2 and of routing processor 300 of FIG. 3 are example configurations, which are chosen purely for the sake of conceptual clarity. In alternative embodiments, any other suitable switching network, routing controller and routing processor configurations can also be used. Elements that are not necessary for understanding the principles of the present invention, such as various interfaces, addressing circuits, timing and sequencing circuits and debugging circuits, have been omitted from the figure for clarity.

Some elements of routing controller 30 such as processors 60, as well as some elements of routing controller 200 such as routing processors 212, 216 and 220, and of routing processor 300 such as FSM 350 may be implemented in hardware, e.g., in one or more Application-Specific Integrated Circuits (ASICs) or FPGAs. Additionally or alternatively, processors 60, routing processors 212, 216 and 220, and routing processor 300 can be implemented using software, or using a combination of hardware and software elements. Memory 64 may comprise any suitable storage element such as, for example, a Random Access Memory (RAM), a Nonvolatile (NVM) memory such as a Flash memory device, or a register array. In some embodiments, memory 64 comprises multiple storage elements of various storage types.

In some embodiments, some of the functions of processors 60, routing controller 200, routing processors 212, 216 and 220 and routing processor 300, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 4:
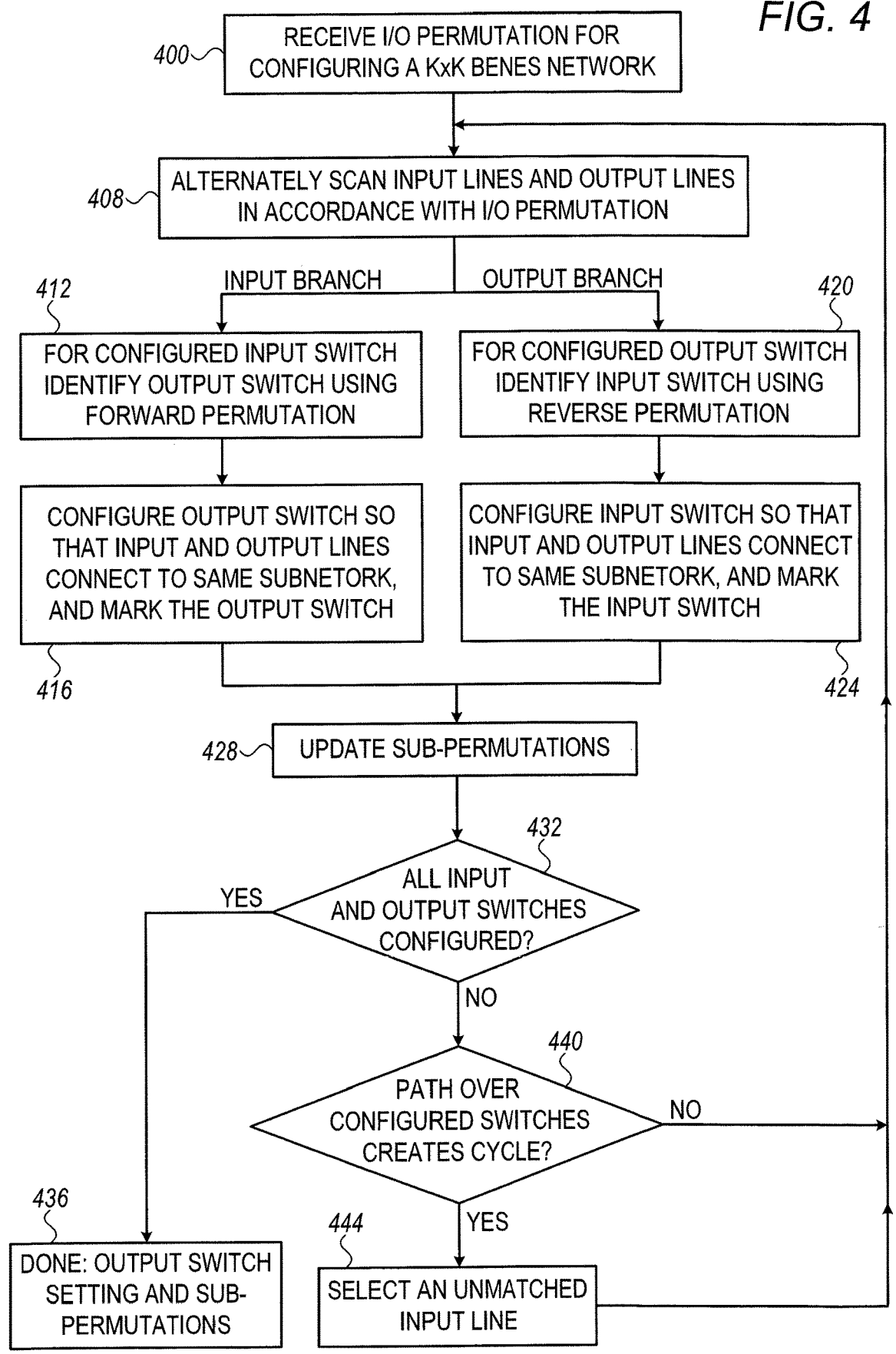
FIG. 4 is a flow chart that schematically illustrates a method for configuring switches in a Benes network, in accordance with an embodiment that is described herein.

FIG. 4 is a flow chart that schematically illustrates a method for configuring switches in a Benes network, in accordance with an embodiment that is described herein.

The method may be executed, for example, by K-by-K routing processor 300, for configuring a K-by-K Benes network or subnetwork having K input lines and K output lines. Input lines and output lines may connect to ports of the Benes network or to 2-by-2 switches of subnetworks of an outer nesting level. The method is described as executed by FSM 350.

At a reception step 400, routing processor 300 receives an I/O permutation 304. In the present example, the I/O permutation comprises a forward permutation and a reverse permutation. The routing processor (e.g., under the FSM control) stores the forward permutation of the received I/O permutation in FWD-permutation buffer 320 and stores the reverse permutation of the received I/O permutation in REV-permutation buffer 324. In an embodiment, before (or in response to) receiving the I/O permutation, FSM 350 marks the K/2 input switches and the K/2 output switches in marking array 360 as unused.

At a scanning management step 408, the FSM alternately scans the input lines and the output lines of the Benes network in accordance with the I/O permutation received at step 400. For example, the FSM starts with the first input line connected to the first input switch (e.g., I0 connected to S11 in FIG. 1), and configures this switch arbitrarily, e.g., to the bar state. The FSM alternately configures output and input switches to meet the connections specified in the I/O permutation, as will be described below.

Following step 408, the method splits into an input branch and an output branch. At an output switch selection step 412, an input switch has recently been configured, and the FSM selects a corresponding output switch using the forward permutation. At an output switch configuration step 416, the FSM configures the selected output switch so that both the input line connected to the input switch of step 412 and the output line connected to its matched output switch of step 416, connect to the same K/2-by-K/2 subnetwork of the next inner nesting level. Further at step 416, the FSM marks the output switch in marking array 360 as "used" along with its configured state.

At an input switch selection step 420, an output switch has recently been configured, and the FSM selects a corresponding input switch using the reverse permutation. At an input switch configuration step 424, the FSM configures the selected input switch so that the output line connected to the output switch of step 420 and the input line connected to its matched input switch of step 424 connect to the same subnetwork of the next inner nesting level. Further at step 424, the FSM marks the input switch in marking array 360 as "used" along with its configured state.

At a sub-permutation updating step 428, FSM 350 updates sub-permutation 312A in buffers 330A and 334A (or sub-permutation 312B in buffers 330B and 334B) based on the input-to-output connection created by configuring the input switches and output switches.

At a loop termination step, 432, the FSM checks whether the K/2 input switches and the K/2 output switches are configured. For example, the FSM checks this condition by calculating a logical AND operation among the 0/1—unused/used marked values in marking array 360. When the condition at step 432 is true, the method proceeds to a method termination step 436. In some embodiments, at step 436, the FSM outputs the bar/cross settings determined for the K/2 input switches and K/2 output switches, as written in the marking array. The FSM further outputs the sub-permutations written in sub-permutation buffers 330A, 334A, 330B and 334B. In alternative embodiments, the information in the sub-permutation buffers is accessible for reading by routing processors handling the K/2-by-K/2 subnetworks of the subsequent inner nesting level.

When the condition at step 432 is false, the FSM proceeds to a cycle checking step 440. A cycle event occurs when a path along the configured input switches and output switches (covering less than the entire input switches and output switches) returns to the first input switch of the path. When at step 440 the FSM detects no cycle, the method loops back to step 408 to continue alternately scanning the input lines and the output lines. Otherwise, a cycle was detected, and the FSM proceeds of an input line selection step 444. In some embodiments, at step 444, the FSM searches for an "unmatched" input line connected to an input switch that is not configured. For example, the FSM selects the first input line connected to an input switch marked as "unused." Following step 444, the method loops back to step 408 to continue the scanning. In some embodiments, the FSM efficiently selects an unmatched input line for continuing the scanning using priority encoder 364, e.g., in a single clock period, as described above.

In some embodiments, the FSM holds information that describes the physical connections of the 2-by-2 switches among themselves and to input and output ports, within the Benes network. To this end, each of the input ports 34, output port 38 and switch 42 is assigned a respective number. For efficient calculation of switch configurations to bar/cross state, the numbers used are selected suitable for bit manipulation operations, such as shift and modulo operations, and logical operation such as, XOR, AND, OR operations.

An Example Configuration Flow

Next is described an example execution of the method of FIG. 4, for configuring 8-by-8 Benes network 24, e.g., by routing processor 300. In describing the example, a reference is made to some steps in the method of FIG. 1 above. Consider an 8-by-8 I/O permutation whose first two input-output relations are given in Table 3 below. The I/O permutation contains a forward permutation and a reverse permutation.

TABLE 3

Two elements of forward and reverse permutation

| Forward permutation | | | | Reverse permutation | | | |
|---|---|---|---|---|---|---|---|
| Input | 0 | 1 | ... | Output | 2 | 3 | ... |
| Output | 2 | 3 | ... | Input | 0 | 1 | ... |

The FSM starts the scanning at step 408 with input port I0, which is connected to switch S11. In the present example, the FSM configures S11 to the bar state, and marks S11 in the marking array as "used" and as set to the "bar" state. Alternatively, configuring the first switch S11 to the cross state is also possible.

In accordance with the forward permutation, input port I0 should be connected to output port O2, which connects to switch S25. At step 416, the FSM calculates the configuration for S25 as "bar" so that both I0 and O2 connect to the same subnetwork 50A. The FSM marks S25 in the marking array, accordingly.

At step 428, the FSM updates the forward and reverse sub-permutations to be used for processing subnetwork 50A.

Looping back to step 408, the FSM uses the reverse permutation to identify that output port O3 connected to the recently configured switch S25 should be connected to input port I1 Since S25 is already configured to the "bar" state, O3 is connected via S25 to subnetwork 50B. Moreover, since S11 is already configured to the "bar state, input port I1 is also connected to subnetwork S25, thus creating a cycle.

At step 440 the FSM detects a cycle from S11 to S25 via subnetwork 50A and back to S11 via subnetwork 50A. In response to detecting the cycle, the FSM searches for an unmatched input port for starting another path, at step 444. For example, the FSM selects input port I2 connected to unused switch S21, and loops back to scanning at step 408.

Routing Processor Code Example

In some embodiments, routing processor 300, including FSM 350 is implemented in a Field-Programmable Gate Array (FPGA) using a suitable program written in any suitable coding language for hardware. An example code segment that can be used by the FPGA to configure a scanned switch is given below.

In writing the code, let "int(·)" denote a short version of the logical operator "to_integer(unsigned(·))" used in an actual coding language. The following variables are also used:

level_0_col_s—denotes used/unused marking of input switch in the marking array.
    level_0_src_idx_col—denotes index of input switch in the marking array.
    level_0_col_d—denotes used/unused marking of output switch in the marking array.
    level_0_dst_idx_col—denotes index of output switch in the marking array.
    level_0_src_idx—denotes index of source (input) line in binary form (e.g., in FIG. 1, index of I0 is "000."
    level_0_dst_idx—denotes index of destination (output) line in binary form (e.g., in FIG. 1, index of O3 is "011."

Code segment:

```
    If (level_0_col_s(int(level_0_src_idx_col))(0)='0') and
(level_0_col_d(int(level_0_dst_idx_col))(0)='0') then
(1)     level_0_col_s(int(level_0_src_idx_col))(0)<= '1';
(2)     level_0_col_s(int(level_0_src_idx_col))(1)<= '0';
(3)     level_0_col_d(int(level_0_dst_idx_col))(0)<= '1';
(4)     level_0_col_d(int(level_0_dst_idx_col))(1)<= level_0_src_idx(0) xor
        level_0_dst_idx(0);
```

The code segment given above implements the following composite operation:

If (input switch is unused) and (output switch is unused) then:
(1) Mark input switch as used.
(2) Configure input switch to "bar" state.
(3) Mark output switch as used.
(4) Configure output switch to state value (A XOR B).

As noted above, A="level_0_src_idx" and B="level_0_dst_idx" denote the binary representation of the indices of I/O couple of lines currently processed. In the expression (A XOR B) at step (4), the Least Significance Bit (LSB) of these indices, indicate whether the index value is even or odd. Note that:
(i) Setting any of the input and output switches (S11, S21 . . . S41, S15 . . . S45) to the bar state, routes the an even indexed I/O line on the upper subnetwork 50A, and an odd indexed line on the lower 50B.
(ii) At step 2 above, the input switch is set to the bar state='0'.

The XOR result between the LSBs of the indices thus gives the correct configuration of the output switch. For example, for an even index "XX0" (X may be '0' or '1') the output switch is set to "bar" for connecting to an output line having an even index, and to "cross" state for connecting to an output line having an odd index. Code segments similar to the one described above are applicable to other pairs of input line to output line connections when one of the output or input switches is already configured.

Performance Evaluation

Consider an FSM 350 that supports adding two connections in a number Nc of clock periods. For example, in some embodiments, Nc≤5 clock periods. Therefore, for configuring for all input and output switches of a N-by-N Benes network, the FSM requires [(N/2)·Nc] clock cycles. For configuring the entire N-by-N Benes network, the clock periods required for calculating the subnetworks settings accumulate. For example, in configuring an 8-by-8 Benes network, the 8-by-8 stage requires [8/2·Nc] clock periods, and the 4-by-4 subnetwork stages (executed in parallel to one another) require additional [4/2·Nc] clock periods. Counting the 2-by-2 clock periods is omitted because it is typically much lower.

The inventors tested hardware implementation of routing controller 200 in which the routing processors are implemented in FPGAs by "Xilinx." The FPGA was developed using the "Vivado" Integrated Design Environment (IDE). Specifically, a medium-sized FPGA device of the Virtex Ultrascale family by the Xilinx vendor has been used.

For an 8-by-8 Benes network, IDE-based results indicate that in terms of resource utilization, minimum clock period and overall running time the disclosed embodiments are significantly better than known solutions.

For a 32-by-32 Benes network the inventors made the following rough estimation:
(i) Resource utilization using a routing controller (e.g., 200) in which routing processors 212, 216 are each implemented, e.g., using routing processor 300, typically consume only little FPGA resources.
(ii) The run time of the routing controller for the 32-by-32 case, would be on the order of one microsecond, for this category of FPGAs. Even better results are expected in using ASIC devices.

The embodiments described above are given by way of example, and other suitable embodiments can also be used. For example, the embodiments described above mainly address N-by-N Benes networks implemented using 2-by-2 switches. The disclosed embodiments, however, are similarly applicable to other suitable switching networks having a nested or recursive topology. For example, a switching network may reduce into more than two subnetworks. As another example, the inner irreducible subnetworks may comprise crossbar switches larger than 2-by-2 switches, e.g., as in Clos networks, with necessary modifications.

Although the embodiments described herein mainly address routing of Benes topologies for optical switches and optical networks, the methods and systems described herein can also be used in other applications, such as in on-chip networks and backplane interconnections.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A routing controller, comprising:
an interface, configured to receive a permutation defining requested interconnections between N input ports and N output ports of a Benes network, wherein the Benes network comprises multiple 2-by-2 switches, and is reducible in a plurality of nested subnetworks associated with respective nesting levels, down to irreducible subnetworks comprising a single 2-by-2 switch; and
multiple processors, configured to:
collectively determine a setting of the 2-by-2 switches that implements the received permutation, including determining sub-settings for two or more subnetworks of a given nesting level in parallel; and
configure the multiple 2-by-2 switches of the Benes network in accordance with the determined setting,
wherein a given processor among the multiple processors is configured to alternately scan input lines and output lines of at least a subnetwork of the Benes network, and to determine states of an input switch coupled to a given input line and of an output switch coupled to a given output line, so that the given input line and the given output line connect to a common subnetwork of a subsequent inner nesting level.

2. The routing controller according to claim 1, wherein a processor assigned to the Benes network is configured to determine states of 2-by-2 switches coupled to the N input ports and to the N output ports, and to produce sub-permutations specifying connections required between N/2 input lines and N/2 output lines of respective subnetworks of the Benes network.

3. The routing controller according to claim 1, wherein a processor assigned to a given subnetwork having K input lines and K output lines, 2<K<N, is configured to receive a K-by-K sub-permutation produced at processing an outer nesting level, to determine states of 2-by-2 switches coupled to the K input lines and to the K output lines, and to produce sub-permutations for configuring K/2-by-K/2 subnetworks of the K-by-K subnetwork.

4. The routing controller according to claim 1, wherein the processors comprise dedicated hardware processors respectively assigned to the Benes network and to the subnetworks of the nesting levels, and wherein a processor assigned to a subnetwork of a given nesting level is configured to communicate sub-permutations for configuring subnetworks of a subsequent inner nesting level via buffers.

5. The routing controller according to claim 1, and comprising a marking array, wherein the given processor is configured to mark already configured input switches and output switches in the marking array, along with their respective states.

6. The routing controller according to claim 1, wherein the given processor is configured to follow a path created by setting the input and output switches, and in response to detecting that the path creates a cycle, to select an input line coupled to an input switch not yet set, from which to continue the scan.

7. The routing controller according to claim 1, wherein a processor is configured to determine a first sub-setting for a given subnetwork, for implementing part of a first permutation of the Benes network, and before a full setting for the entire Benes network corresponding to the first permutation is calculated, to further determine a second sub-setting for the given subnetwork for implementing part of a subsequently received second permutation for the Benes network.

8. The routing controller according to claim 1, wherein the 2-by-2 switches comprise 2-by-2 optical switches interconnected using optical links, wherein the processors are configured to determine bar or cross states for the 2-by-2 optical switches so as to route light signals between the N input ports and the N output ports in accordance with the received permutation.

9. A method, comprising:
in a routing controller comprising an interface and multiple processors, receiving via the interface a permutation defining requested interconnections between N input ports and N output ports of a Benes network,
wherein the Benes network comprises multiple 2-by-2 switches, and is reducible in a plurality of nested subnetworks associated with respective nesting levels, down to irreducible subnetworks comprising a single 2-by-2 switch;
collectively determining, by the processors, a setting of the 2-by-2 switches that implements the received permutation, including determining sub-settings for two or more subnetworks of a given nesting level in parallel; and
configuring the multiple 2-by-2 switches of the Benes network in accordance with the determined setting, wherein determining the setting comprises alternately scanning input lines and output lines of at least a subnetwork of the Benes network, and determining states of an input switch coupled to a given input lines and of an output switch coupled to a given output line, so that the given input line and the given output line connect to a common subnetwork of a subsequent inner nesting level.

10. The method according to claim 9, wherein determining the setting comprises determining states of 2-by-2 switches coupled to the N input ports and to the N output ports, and producing sub-permutations specifying connections required between N/2 input lines and N/2 output lines of respective subnetworks of the Benes network.

11. The method according to claim 9, wherein determining a sub-setting for a given subnetwork having K input lines and K output lines, 2<K<N, comprises receiving a K-by-K sub-permutation produced at processing an outer nesting level, determining states of 2-by-2 switches coupled to the K input lines and to the K output lines, and producing sub-permutations for configuring K/2-by-K/2 subnetworks of the K-by-K subnetwork.

12. The method according to claim 9, wherein the processors comprise dedicated hardware processors respectively assigned to the Benes network and to the subnetworks of the nesting levels, and comprising communicating by a processor assigned to a subnetwork of a given nesting level, sub-permutations for configuring subnetworks of a subsequent inner nesting level via buffers.

13. The method according to claim 9, and comprising marking already configured input switches and output switches in a marking array, along with their respective states.

14. The method according to claim 9, wherein and comprising following a path created by setting the input and output switches, and in response to detecting that the path creates a cycle, selecting an input line coupled to an input switch not yet set, from which to continue the scanning.

15. The method according to claim 9, wherein determining the setting comprises determining a first sub-setting for a given subnetwork, for implementing part of a first permutation of the Benes network, and before a full setting for the entire Benes network corresponding to the first permutation is calculated, further determining a second sub-setting for the given subnetwork for implementing part of a subsequently received second permutation for the Benes network.

16. The method according to claim 9, wherein the 2-by-2 switches comprise 2-by-2 optical switches interconnected using optical links, wherein determining the setting comprises determining bar or cross states for the 2-by-2 optical switches so as to route light signals between the N input ports and the N output ports in accordance with the received permutation.

* * * * *